US009909742B2

(12) United States Patent
Pierce et al.

(10) Patent No.: US 9,909,742 B2
(45) Date of Patent: *Mar. 6, 2018

(54) COMPACT ENVIRONMENTALLY ISOLATED CYLINDRICAL PLATFORM FOR OPTICAL COMPONENTS

(71) Applicant: Photometics, Inc., Lafayette, CA (US)

(72) Inventors: Brian N. Pierce, Chico, CA (US); Lawrence A. Zulch, Lafayette, CA (US)

(73) Assignee: Photometics, Inc., Lafayette, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/612,905

(22) Filed: Jun. 2, 2017

(65) Prior Publication Data

US 2017/0268755 A1 Sep. 21, 2017

Related U.S. Application Data

(63) Continuation of application No. 14/495,784, filed on Sep. 24, 2014, now Pat. No. 9,702,532.

(60) Provisional application No. 61/881,897, filed on Sep. 24, 2013.

(51) Int. Cl.
| | |
|---|---|
| *F21V 21/00* | (2006.01) |
| *F21V 29/58* | (2015.01) |
| *F16M 11/22* | (2006.01) |
| *F21V 21/14* | (2006.01) |
| *F21V 29/60* | (2015.01) |

(52) U.S. Cl.
CPC .............. *F21V 21/00* (2013.01); *F16M 11/22* (2013.01); *F21V 21/14* (2013.01); *F21V 29/59* (2015.01); *F21V 29/60* (2015.01)

(58) Field of Classification Search
CPC .......... F21V 21/00; F21V 21/14; F21V 29/59; F21V 29/60; F16M 11/22
USPC ...................................... 362/249.06
See application file for complete search history.

(56) References Cited

U.S. PATENT DOCUMENTS

| | | | |
|---|---|---|---|
| 5,669,703 | A | 9/1997 | Wheeler |
| 6,483,254 | B2 | 11/2002 | Vo |
| 7,604,380 | B2 | 10/2009 | Burton |
| 8,322,885 | B2 | 12/2012 | Chen |
| 2011/0075412 | A1 | 3/2011 | Wu |
| 2012/0120661 | A1 | 5/2012 | Uemoto |
| 2013/0128578 | A1* | 5/2013 | Yu .............................. F21S 8/04 362/244 |

* cited by examiner

*Primary Examiner* — Laura Tso
(74) *Attorney, Agent, or Firm* — Van Pelt, Yi & James LLP

(57) ABSTRACT

A compact, environmentally isolated platform for mounting optical components, comprising a plurality of similarly shaped substantially flat plates, an enclosing structural element, and an interior structural element. The similarly shaped substantially flat plates define planes generally parallel to each other. The enclosing structural element is shaped to generally contain the plurality of similarly shaped substantially flat plates with an interior surface shaped to accommodate the perimeters of the plurality of similarly shaped substantially flat plates, and surrounds the perimeters of the plurality of similarly shaped substantially flat plates. The interior structural element passes through or connecting at least two of the plurality of similarly shaped substantially flat plates to provide structural support.

22 Claims, 11 Drawing Sheets

Plate and Central Cylinder Assembly    Optical Components for an Ultra Short Pulse Laser Plate and Central Cylinder Assembly Plate and Central Cylinder Assembly Plate and Central Cylinder Assembly Optical Components for an Ultra Short Pulse Laser Cross-section of Plate and Inner Cylinder Assembly with Optical Components Detail View of Mounting Plate Fitting into Crosswise Slot in Central Cylinder Section of Insulated Enclosure with Cylinder Assembly Insulated Casing (Section) Around Cylinder With Isolated Wheel Assemblies Plates and Structural Elements - Four-sided Curvilinear Polygon Plates and Structural Elements - 12-sided Polygon

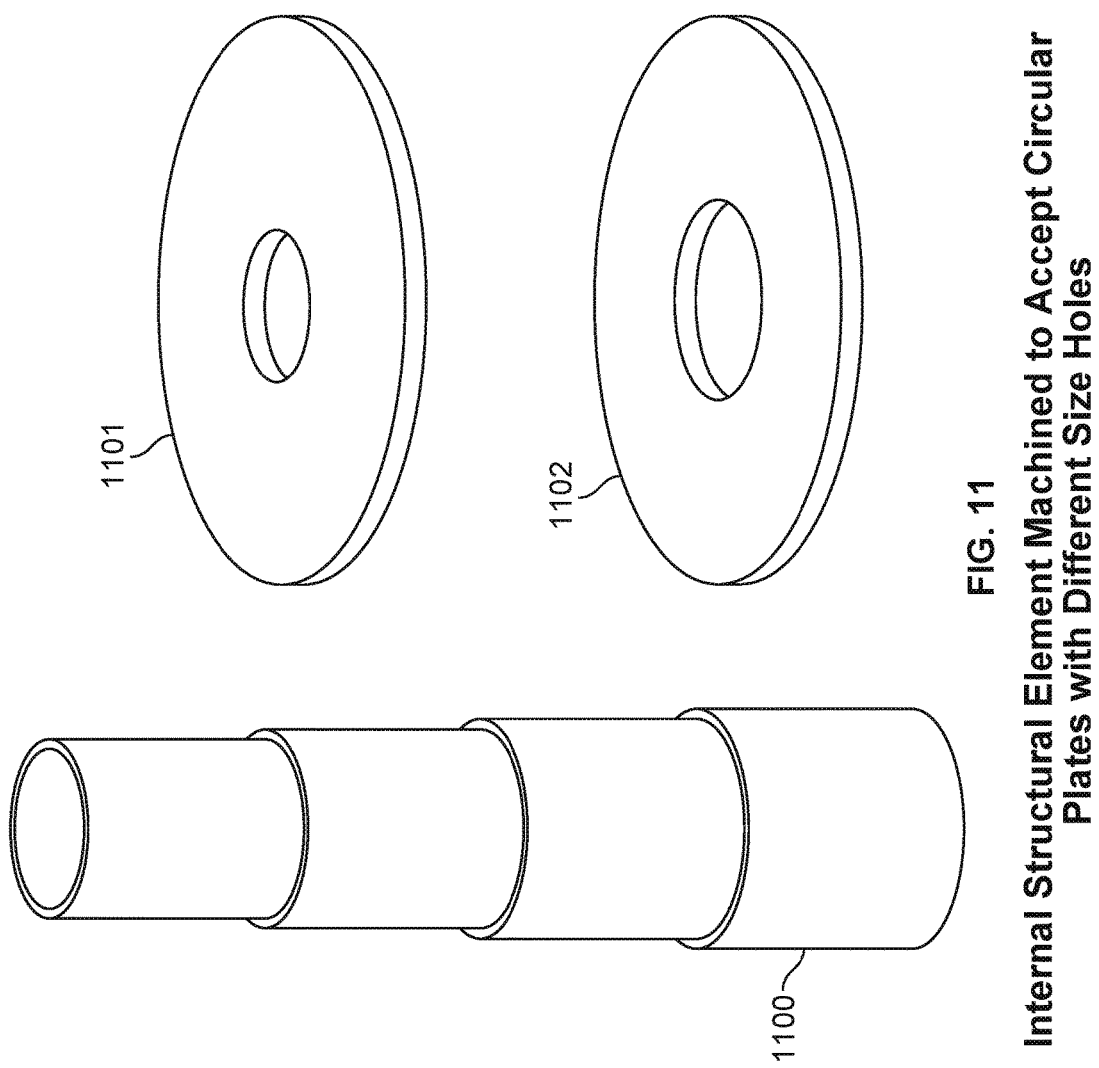

COMPACT ENVIRONMENTALLY ISOLATED CYLINDRICAL PLATFORM FOR OPTICAL COMPONENTS

This application is a continuation of co-pending U.S. patent application Ser. No. 14/495,784, entitled COMPACT ENVIRONMENTALLY ISOLATED CYLINDRICAL PLATFORM FOR OPTICAL COMPONENTS, filed Sep. 24, 2014, which claims priority to U.S. Provisional Patent Application No. 61/881,897, entitled COMPACT ENVIRONMENTALLY ISOLATED CYLINDRICAL PLATFORM FOR OPTICAL COMPONENTS, filed Sep. 24, 2013, both of which are incorporated herein by reference for all purposes.

BACKGROUND OF THE INVENTION

Optical systems that comprise multiple optical components such as light sources, detectors, mirrors, lenses, gratings, filters, attenuators, beam shapers, instruments, and the like, function correctly only when those components are maintained in precise alignment. Such multi-component optical systems, used to produce, detect, or transform light energy, can be found in industry, laboratories, medical facilities and elsewhere. Typically, optical systems require heavy and stiff optical tables with pneumatically isolated supports for mounting and adjustment. The use of these multi-component optical systems in less controlled environments, such as outdoors, in factories or warehouses, or when mobility is required, has been limited to date by their size, weight, and sensitivity to their environment.

BRIEF DESCRIPTION OF THE DRAWINGS

The following is a brief description of the accompanying drawings. Various embodiments of the invention are disclosed in greater specificity in the detailed description and the drawings themselves.

FIG. 11 is a diagram illustrating an example of an embodiment of an internal structural element.

DETAILED DESCRIPTION

Figure 1:
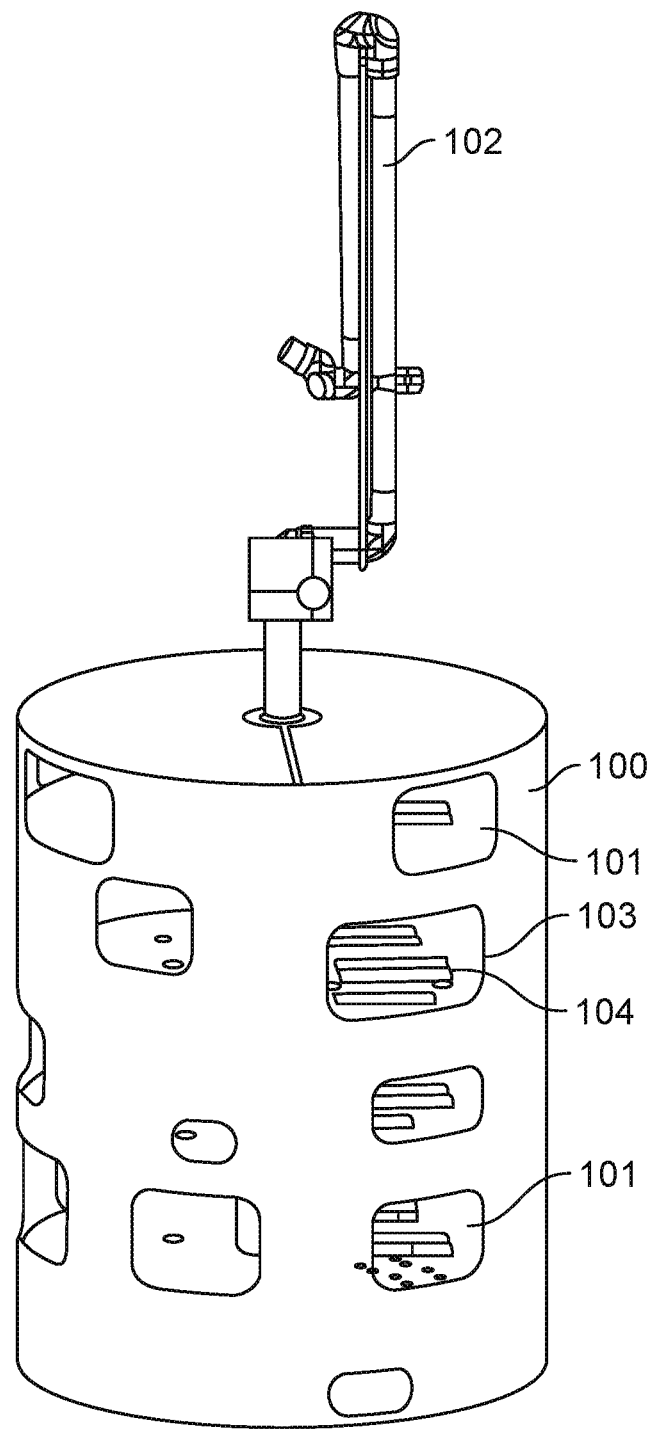
FIG. 1 is a diagram illustrating an example embodiment of a cylindrical platform for an optical system with an output device.

A detailed description of one or more embodiments of the invention is provided below along with accompanying figures that illustrate the principles of the invention. The invention is described in connection with such embodiments, but the invention is not limited to any single embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A compact, environmentally isolated platform for mounting optical components comprises a plurality of plates for mounting optical components, each with a perimeter that in various embodiments is circular or generally circular, oval or generally oval, substantially in the form of a curvilinear polygon (a multi-sided shape made up of curved lines), or substantially in the form of a polygon with a sufficient number of sides to approximate a curvilinear polygon (for example, a regular twelve-sided shape has many of the characteristics of a circular shape, such as an average diameter and a circumference.) In various embodiments, the plates are flat, substantially flat (meaning that they are flat where needed to accept standard optical mounts but may be bent or curved in other places), or any other appropriate configuration. These plates are mounted within an enclosing structural element with an inside surface that matches the perimeter of the plates and in various embodiments is a cylinder, an oval tube, a many-sided prism shape, or any other appropriate shape. The walls of the enclosing structural element may be, but need not be solid. As will be seen, in some embodiments, openings in the wall of the enclosing structural elements are permitted.

In various embodiments, one or more interior structural elements penetrate the centers of the plates or some of the plates. In other embodiments, the interior structural element or elements are offset from the center of the plates. The interior structural element provides structural support, a beam path, or both. In some embodiments, interior structural elements may be wholly lacking. Other geometries that provide additional stability, including geometries where the interior structural elements support but do not penetrate the plates, may also be within the scope of the disclosed.

In various embodiments, the structural elements and plates have openings, holes, penetrations, hatches, removable sections, or any other means required for light and other signals to pass between components in free space or to be transmitted through an optical component, for light and other signals to travel into and out of the optical platform, for access to make adjustments, replace, repair, mount or de-mount components, to accommodate optical components too large to fit between plates, or for any other required use.

In various embodiments, the assembly comprising the plates, the enclosing structural element, and the interior structural element penetrating the plates (if any) is enclosed in an uninsulated external enclosure, an insulated external enclosure, an external enclosure made up of multiple components, a vacuum flask, or any other suitable container.

In various embodiments, the larger enclosing structural element, the flat circular plates, and the smaller internal structural element (if any) are composed of steel, stainless steel, nickel-iron alloy, aluminum alloy, non-ferrous metal, a composite, such as fiber-reinforced polymer or a ceramic matrix, or any other appropriate material. In some embodiments, the flat plates, the enclosing structural element, and the internal structural element (if any) are comprised of the same material. In some embodiments, the flat plates, the enclosing structural element, and the internal structural element (if any) are comprised of different materials.

In some embodiments, the compact environmentally isolated cylindrical platform for optical components is mounted on isolators to reduce the transmission of vibration from the environment in which it is placed. In some embodiments, a damping system is employed. In some embodiments, the damping system comprises a dissimilar material that in various embodiments is adhered to the enclosing structural element, the interior structural element, the plates, or any other suitable surface.

The importance of stability and isolation from thermal changes to optical systems is well known; in 1920, Charles Édouard Guillaume received the Nobel Prize in Physics for his discovery of invar, a nickel steel alloy that has a low coefficient of thermal expansion, used since in many optical systems to reduce temperature-induced movement.

Optical systems typically comprise multiple components, such as light sources, detectors, mirrors, lenses, gratings, filters, attenuators, beam shapers, instruments, and the like, each of which must be mounted in a fashion that maintains its position in a manner sufficiently stable for its function given the environment in which it operates and the duration of time over which it must function without adjustment. Optical components must remain accessible for adjustment, replacement, or removal. Physical characteristics such as the required distance between components, number of components, overall size, and weight must all be accommodated by the system used for mounting the optical components.

Modern optical systems are highly sensitive to movement between components. For example, some laser applications require a beam waist, the location in an optical beam with the smallest cross-section, measured in microns. Other applications require light to maintain a precise wavelength. Since light travels at a constant speed, relative movement between components can minutely change the wavelength of light. Short-pulse lasers, with pulse durations typically measured in nanoseconds, and ultrashort-pulse lasers, with pulse durations typically measured in picoseconds or femtoseconds, require a very stable optical platform so that the pulses are correctly created, aligned, and transmitted. Interferometers, used in many fields for precision measurements resulting from superimposing one waveform on another, similarly require very high levels of stability to provide meaningful and reliable results.

Current practice mounts optical components to an optical table system. An optical table system comprises an optical table on a support system. The optical table, designed to maintain a rigid and flat surface, typically comprises four components: a flat top skin, typically with threaded holes for component mounting; a sealed layer to prevent foreign material from reaching the core; the core material; and a bottom skin. The optical table is typically mounted on supports that may provide isolation from ambient vibration noise, often through the use of pneumatic isolators. Structural damping systems may also be incorporated in the optical table system (for example, a mass damper, such as a weight suspended in oil, or a broadband damper, which may be plates loosely coupled with an adhesive material).

The performance of an optical table system may be measured by three principal factors: natural resonant frequency, deflection, and internal energy dissipation. The natural resonant frequency is the frequency at which the system tends to achieve a repetitive deflection, either bending or twisting depending on the ratio of side to length, when subject to regular environmental inputs such as vibrations or oscillations. The desired natural resonant frequency of an optical table system will be higher than common environmental inputs such as building vibrations that most commonly occur between 6 and 60 hertz. Deflection describes the deformation undergone by the optical table from asymmetric forces such as a load between supports or its own weight. Internal energy dissipation describes the ability of the optical table system to absorb kinetic (vibrational) energy, transforming it into minute amounts of increased temperature rather than physical motion.

To achieve appropriate performance for each of these factors, optical table systems are available in a variety of materials at thicknesses that typically range from two inches to thirty-six inches. These thicknesses result in optical table systems that may be very heavy (for example, over 1000 kilograms (2200 pounds) in the case of a four-foot by eight-foot table that is 36 inches thick).

The large size and great weight of high performance optical table systems, a result of stabilizing a large flat surface, the optical table top, that is not inherently resistant to deformation, creates significant limitations on their use. They are too heavy to move easily, they are difficult to enclose for isolation from their environment, and they are too massive to quickly achieve a new stable temperature when ambient temperatures fluctuate. Therefore, optical table systems are almost always found in a fixed location in a consistent and highly controlled environment.

However, as precision optical systems move from the laboratory to the field, they typically require mobility, isolation from their environment, and a compact size. For example, it may be desirable to mount a medical device that emits ultrashort-laser pulses on wheels and bring it into a treatment room. Even if the device will not be moved once installed, a compact configuration is required in most treatment rooms. Finally, it may not be practical to govern the temperature of the environment and prevent airborne contaminants in the environment where the optical system will be used. In the case of an optical system that requires hours or days to achieve temperature equilibrium, it will not be sufficient to maintain an environment appropriate for the optical system while it is being used. Such environment must be maintained for hours or days before use, which may prevent the user of the space from making otherwise desired environmental changes, such as reducing or raising the temperature in a room or building when it is not occupied.

Optical systems used in the field or situations requiring mobility typically utilize breadboards, which share many characteristics with and may be identical to optical tables of the same thickness in an optical table system. Typically two to four inches thick, multiple breadboards may be stacked to achieve a more compact form factor. Since the performance of a breadboard system is limited by the thickness of the breadboards, performance is inferior to that of optical table systems with thicker optical tables, limiting their use to optical systems that do not require the high precision afforded by thicker optical table systems.

The process of developing the compact optical platform disclosed and claimed herein, with the stability of an optical table system and a form factor at least as compact as stacked breadboards, started with an attempt to improve the performance characteristics of stacked breadboards. The means of connection between stacked breadboards was made more robust in various ways, including precision-cut standoffs. Stacked breadboards were placed in reinforced enclosures. Additional damping was employed. Even stacking breadboards with enough connectors such that space for mounting optical components was severely limited did not yield performance approaching an optical table of similar overall thickness.

The stacked breadboard configuration falls into the category of geometric shapes known as a rectangular solid or rectangular prism. Other rectangular solids were explored, with breadboards forming the supports in some instances. However, in each case, the flat rectangular surfaces were still subject to unwanted lack of rigidity or an inability to mount optical components efficiently or both.

Since neither parallel flat planes nor combinations of parallel and perpendicular flat planes met the needed performance, it was postulated that a different fundamental geometric shape should be considered. A large number of alternatives were evaluated. In order to achieve a compact form factor, the investigation was narrowed to those geometric shapes that are three-dimensional.

Triangles are inherently more stable then rectilinear geometric forms. In an attempt to use the greater inherent stability of triangles, configurations ranging from pyramids to triangular prisms were explored. However, triangular solids create multiple challenges. Those challenges include the use of structural flat surfaces still subject to unwanted characteristics and inefficiency in space utilization since optical components cannot be mounted very close to the intersection of two planes that join at an acute angle.

After examining various configurations of flat planes and finding them unable to meet the desired characteristics of inherent resistance to deformation, a high natural frequency, a compact form factor, and flexibility in mounting optical components, alternatives were required.

A simple curved surface, a geometric solid with high inherent stability, was explored, but exhibited challenges: mounting optical components requires specialized mounts, calculating optical component spacing is more challenging in three dimensions than on a flat surface, and space utilization is inefficient unless the curve is extreme, which creates problems in access.

The geometric solid with the most appropriate inherent characteristics for stability, resistance to deflection, and natural resonance frequency is a cylinder. However, a cylinder used for mounting optical components exhibits all of the drawbacks of a curved surface.

An unexpected insight led to considering maximum form stability independently of the optimum mounting configuration. Maximum form stability is achieved through the use of a cylinder or other curved shape, including an oval, a tube with a cross-section of a curvilinear polygon, or a prism made up of enough sides so that a cross-section approximates a curvilinear polygon. The optimum configuration for mounting optical components in a compact fashion is through the use of parallel or substantially parallel, flat or substantially flat plates. These have been combined in the disclosed.

In some embodiments, multiple flat plates are located within a larger enclosing cylinder. In various embodiments, the enclosing structural element is a cylinder, an oval tube, a many-sided prism shape, or any other appropriate shape that functions similarly to a cylinder. In various embodiments, the enclosing structural element is a single component, made up of multiple pieces that together form the enclosing structural element, or any other configuration that forms the structural element when assembled. In some embodiments, the multiple flat plates are mounted parallel to each other. The parallel flat plates are firmly affixed around their circumference (or at appropriate intervals around their circumference) to the inner surface of the larger enclosing cylinder. In various embodiments, the connections between the parallel flat plates and the larger enclosing cylinder are made through a friction fit, a weld, adhesive, threaded fasteners, heat shrink fitting, liquid nitrogen shrink fitting, hydroforming, or any other applicable process.

In some embodiments, a smaller interior structural element passes through openings in the parallel flat plates. In some embodiments, the interior structural element is firmly affixed to the parallel flat plates through which it passes. In various embodiments, the interior structural element is a cylinder, an oval, a triangular tube, a square tube, or a many-sided prism shape, or any other appropriate shape. In various embodiments, the length of the interior structural element is less than the length of the larger enclosing structural element, the same length as the enclosing structural element, or longer than the enclosing structural element. In some embodiments, there is more than one smaller interior structural element. In various embodiments, the connections between the parallel flat plates and the interior structural element are made through a friction fit, a weld, adhesive, threaded fasteners, heat shrink fitting, liquid nitrogen shrink fitting, hydroforming, or any other applicable process.

In some embodiments, the parallel flat plates are circular in shape and 20 inches in diameter, so the enclosing structural element is a cylinder with an interior diameter that is likewise 20 inches. In some embodiments, the interior structural element is a cylinder with an external diameter of three inches, so the penetrations in the parallel flat plates are three inches in diameter. In some embodiments, the enclosing cylinder is 30 inches long. In some embodiments, the smaller central cylinder is likewise 30 inches long. In some embodiments, there are five parallel flat plates, with approximately seven inches between each plate.

In some embodiments, the parallel flat plates have slots in them along their radius that enable an interference fit with the smaller central cylinder when the slot is mechanically expanded and an interference fit with the larger enclosing cylinder when mechanically reduced. In some embodiments, the interference fit is created through hydroforming the interior structural element, e.g. pressurizing the temporarily sealed cylinder with sufficient pressure to increase its diameter.

In some embodiments, the interior structural element is a cylinder that is machined in progressively smaller diameters corresponding to the desired distance between the parallel flat plates. A step between each change in diameter forms a mounting surface for one of a plurality of parallel flat plates with a penetration in each parallel flat plate equal to the diameter of the interior structural cylinder at the desired height. In various embodiments, the mounting surface is a step or ledge perpendicular to the lengthwise direction of the interior structural element, angled to slope out from the interior structural element, angled to slope into the interior structural element, a shape that varies along its circumference, a smooth surface, a rough surface, or any other configuration making appropriate connection between the interior structural element and one or a plurality of parallel flat plates.

In some embodiments, the enclosing structural element is a cylinder that is machined in progressively smaller diameters corresponding to the desired distance between the parallel flat plates. A step between each change in diameter forms a mounting surface for one of a plurality of parallel flat plates with the enclosing circumference of each parallel flat plate equal to the diameter of the enclosing cylinder at the desired height. In various embodiments, the mounting surface is a step or ledge perpendicular to the lengthwise direction of the enclosing structural element, angled to slope out from the interior surface of the enclosing structural element, angled to slope into the interior surface of the enclosing structural element, a shape that varies along its circumference, a smooth surface, a rough surface, or any other configuration making an appropriate connection between enclosing structural element and one or a plurality of parallel flat plates.

In some embodiments, the enclosing structural element or elements do not penetrate the parallel flat plates, but secure them at appropriate distances from one another.

In some embodiments, the circumferences of the parallel flat plates are beveled to correspond to grooves in the enclosing structural element. In various embodiments, the groove is 37 degrees to correspond to JIC (Joint Industry Council) standards, 45 degrees, or any other angle that provides an appropriate mechanical connection. In some embodiments, the enclosing structural element comprises components that can be assembled around the parallel flat plates.

In some embodiments, both the enclosing structural element and the interior structural element comprise progressively smaller diameters with corresponding distances between the mounting surfaces. In various embodiments, the direction of the decreasing diameters is the same in both structural elements, in counterpoint so that the progressively smaller diameters of one structural element correspond to progressively larger diameters of the other, or any other configuration that makes an appropriate connection between the larger enclosing structural element, the interior structural element, and one or a plurality of parallel flat plates. Not all embodiments are characterized by intimate contact between the enclosing structural element and the parallel flat plates or the interior structural element and parallel flat plates for the full 360 degrees of their respective perimeters.

In various embodiments, optical components are mounted to each plate using regularly spaced threaded holes, threaded holes located where optical components are to be mounted, bolts or screws through holes in the plates, or any other appropriate mounting method.

In some embodiments, the parallel flat plates incorporate mounting brackets for optical components as part of their structure.

In some embodiments, the parallel flat plates have openings or holes in them. In various embodiments, the openings are used for access to internal components, a beam path, mounting optical components, pathways for wires, pathways for cooling lines, any of these in combination, or any other use requiring openings in the plates. In some embodiments, multiple parallel flat plates have aligned openings or holes to allow the positioning of large optical components.

In some embodiments, the enclosing structural element has openings or holes in it. In various embodiments, the openings provide access to the parallel flat plates for adding and removing optical components, access to the optical components for adjustment and maintenance, a beam path, a pathway for wires, a pathway for cooling lines, any of these in combination, or any other use requiring openings in the enclosing structural element.

In some embodiments, the interior structural element is hollow. In some embodiments, the interior structural element provides a convenient beam path for the output of the optical components mounted in the optical platform. In various embodiments, the beam enters the interior structural element through apertures, from one end of the interior structural element, or any other appropriate means. In some embodiments, an aperture of the interior structural element is aligned with a 45-degree mirror inside the interior structural element that directs the beam along the length of the interior structural element and into the output device. In various embodiments, irises to shape and manage the beam are placed at the bottom of the interior structural element, at the top of the interior structural element, both the bottom and the top of the interior structural element, or in any other useful location.

It is generally desired that an output device maintain precise alignment with the optical device components, yet not provide a source of vibration or other motion. In some embodiments, the interior structural element is used to mount the output device. In some embodiments, the output device is mounted to the enclosing structural element or external enclosure for the platform. In various embodiments, the output device is an articulated arm, a fiber-optic bundle, a light guide, a liquid light guide, mirrors, or any other suitable output device.

There are a number of ways to isolate the compact environmentally isolated cylindrical platform for mounting optical components from the environment in which it is placed. In some embodiments, the openings or holes in the enclosing structural element are sealed with plates or by other appropriate means. Because the cylindrical platform for mounting optical components is relatively compact, in some embodiments the entire plate and structural element assembly is placed in an external enclosure.

In some embodiments, the external enclosure is sealed, making it unnecessary to cover openings or holes in the enclosing structural element to prevent the incursion of dust, particles, vapors, humidity, and other airborne contaminants.

In various embodiments, the external enclosure is uninsulated, primarily functioning to isolate the plate and structural element assembly from unwanted environmental components such as dust. In other embodiments, external enclosure is insulated to increase temperature isolation, comprises a vacuum flask (or Dewar flask), comprises a partial vacuum flask, or any other type of appropriate enclosure. In some embodiments, the external enclosure is sealed and able to maintain positive or negative air pressure with minimal leakage.

In some embodiments, creating an environment with positive gas or air pressure is generally more effective than a mere barrier system in preventing the incursion of dust, particles, vapors, and other airborne contaminants. It is only practical to create positive gas or air pressure in a sealed enclosure. While optical table systems may be found in rooms with positive pressure, it is generally not practical to enclose an optical table system in an enclosure that can be transported. In some embodiments, the compact environmentally isolated cylindrical platform for mounting optical components is placed in a sealed external enclosure and positive gas or air pressure is maintained. It is desired that the gas or air be low in humidity, therefore called a "dry gas." In various embodiments, the gas used to create positive pressure can be de-humidified and filtered air, bottled nitrogen, a bottled noble gas such as argon, or any other appropriate gas.

In some embodiments, outgassing from wire insulation, labels, glue, and other materials often found in or along with optical components can create problems by coating mirrors, lenses, and other delicate optical parts. In some embodiments, the sealed plate and structural element assembly or the external enclosure includes a port or valve that enables periodic flushing of the gas or air to reduce the effect from outgassing from internal optical components.

In some embodiments, holes or penetrations in the external enclosure correspond to or are aligned with holes or penetrations in the enclosing structural element, allowing adjustment or maintenance of optical components without removing the external enclosure. In some embodiments, doors or hatches seal the holes or penetrations in the external enclosure. In some embodiments, provision is made to increase the volume of gas or air while a door or hatch is open to prevent the incursion of contaminants while optical components are being adjusted or maintained. In various embodiments, a glove box, a bag, or any other apparatus that provides full or partial sealing is affixed to the external enclosure, reducing the amount of air or gas required to prevent the incursion of contaminants.

Typical practice cools specific optical components using a cooling fluid, often water, that travels through channels or tubes in the optical components that require cooling. Because the cylindrical platform for optical components is compact and can be fully enclosed in an external enclosure, in some embodiments a cooling system keeps the entire cylindrical platform for mounting optical components at or near a single, constant temperature. In some embodiments, this general cooling system is combined with cooling specific components. In some embodiments, the cooling system uses a chiller to provide a flow of cooling fluid at a regulated temperature. In some embodiments, the entire plate and structural element assembly is cooled to cryogenic temperatures. In various embodiments, the cooling fluid is water, another liquid, liquefied gas, or another appropriate fluid. In various embodiments, the liquefied gas used for cooling is air, nitrogen, methane, hydrogen, methane, ammonia, or any other appropriate gas.

In various embodiments, the cooling fluid flows through hoses, through channels in one or multiple structural elements, through channels in one or more plates, or any other suitable means of achieving the desired results. In some embodiments, the cooling fluid flows through one or more heat exchangers. In some embodiments, the enclosing structural element has channels or tubes comprising the function of a heat exchanger or evaporator in a closed-loop Freon system, reducing or eliminating the need to have a separate heat exchanger.

In various embodiments, this cooling system is controlled using a thermocouple, multiple thermocouples, calculated heat load, or any other control system that monitors and adjusts cooling within appropriate parameters.

In some embodiments, by keeping the entire plate and structural element assembly within a narrow and well-regulated temperature band, it becomes practical to use materials with a higher coefficient of thermal expansion than would be suitable for optical systems subject to greater temperature variation. This can further reduce the mass of the thermally isolated cylindrical platform for mounting optical components. In various embodiments, aluminum, magnesium, titanium, any other suitable metal, or alloys of any of these metals are used as a structural material as are appropriate composite materials.

Environments subject to vibration can negatively impact optical system performance, even when the optical system is appropriately rigid and has a resonant frequency outside of the range of the environmental input. In some embodiments, the entire compact cylindrical platform including external enclosure (if any) is mounted on one or more vibration isolators. In some embodiments, the plate and structural element assembly is isolated from the external enclosure. In some embodiments, four vibration isolators are affixed at equidistant intervals around the bottom perimeter of the plate and structural element assembly and placed within the external assembly. In some embodiments, the external enclosure is mounted on one or more vibration isolators and the plate and structural element assembly is isolated from the external enclosure. In various embodiments, the vibration isolators used are active, passive, elastomeric, tilt-motion, horizontal-motion, vertical-motion, pneumatic, negative-stiffness, or any other appropriate isolator type used singly or in combination.

FIG. 1 is a diagram illustrating an example embodiment of a cylindrical platform for optical components. In the example shown, external cylinder 100 encloses mounting plates 101. In this embodiment, output device 102 is a common articulated arm with mirrors at each joint maintained in precise alignment when the arm is moved. Penetrations 103 of cylinder 100 enable access to mounting plates 101 for mounting, aligning, and adjusting optical components. Penetrations 104 of mounting plates 101 can be used for beam paths, access, or mounting large optical components or an internal structural element.

Figure 2:
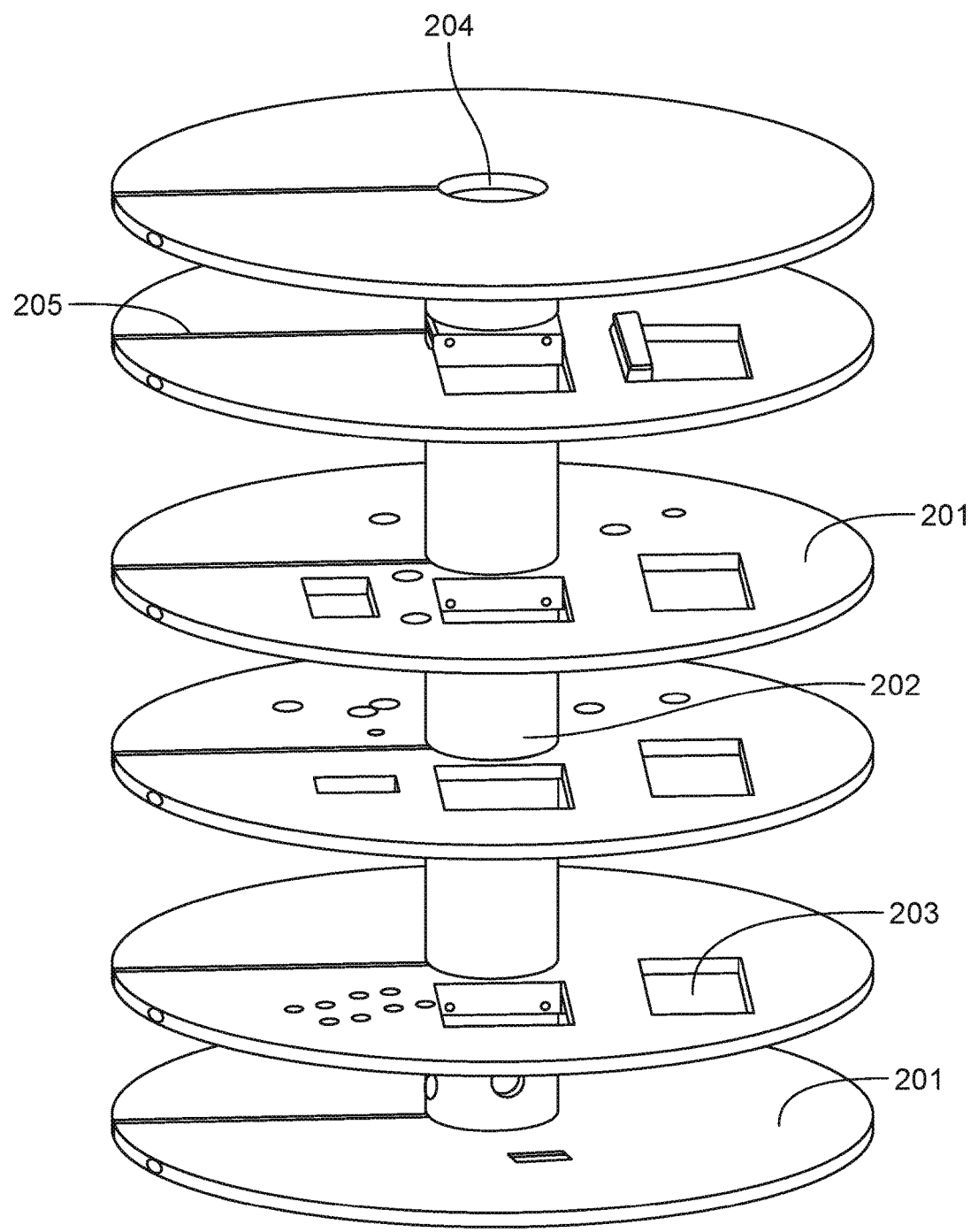
FIG. 2 is a diagram illustrating an example embodiment of components for a cylindrical platform for an optical system consisting of interior plates and a central cylinder.

FIG. 2 is a diagram illustrating an example embodiment of the interior structure of a compact cylindrical platform for optical components. In this embodiment, six plates (two of which are identified 201) are mounted to cylindrical internal structural element 202. Penetrations (such as penetration 203) allow larger components to be mounted or can be used for a beam path between the spaced defined by the plates. Beam exit path 204 enables an output device to be used in communication with cylindrical internal structural element 202. Slot 205 enables an interference fit to central cylinder 202 and to the enclosing cylinder (not shown).

Figure 3:
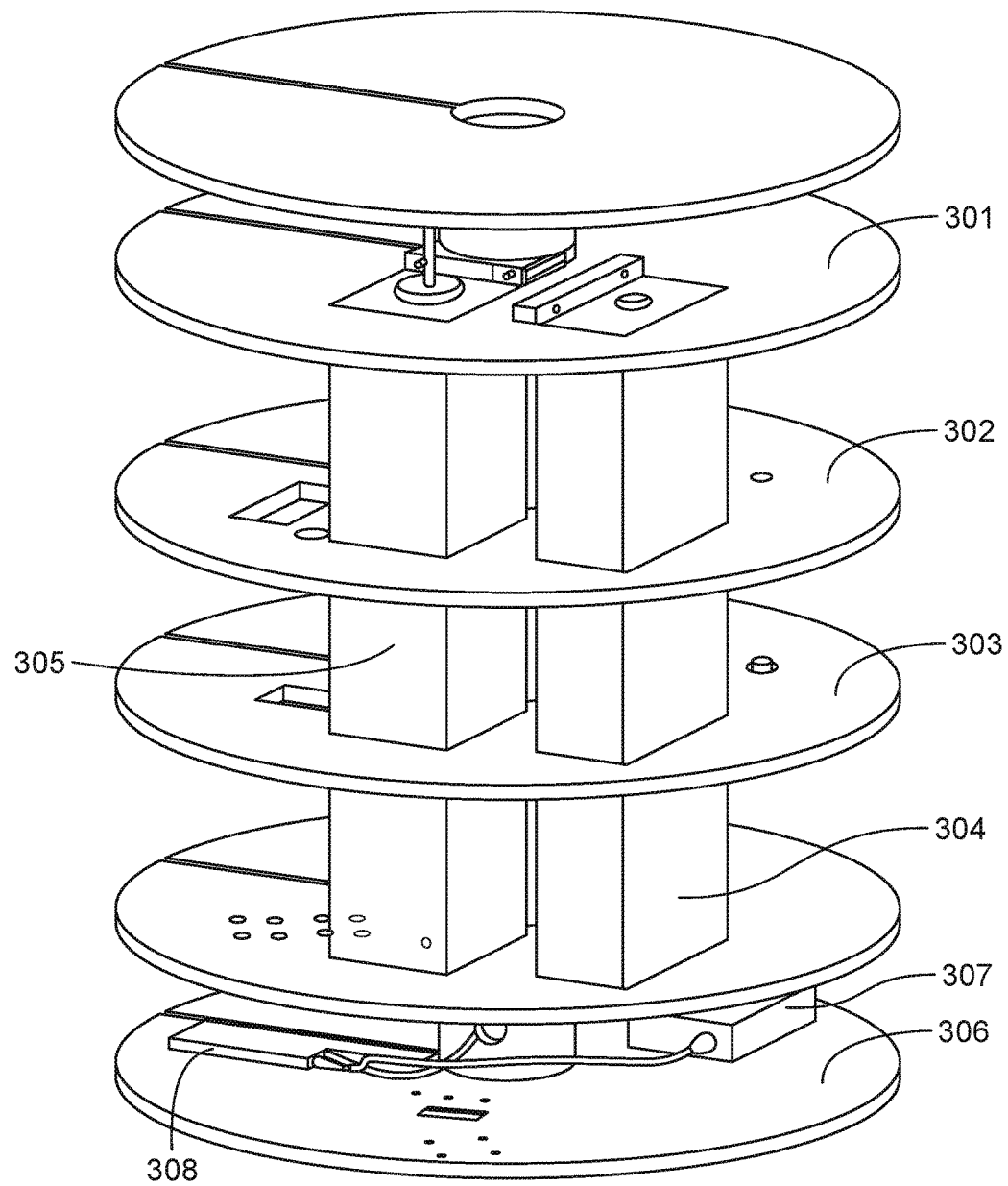
FIG. 3 is a diagram illustrating an example embodiment of the interior plates and central cylinder of a cylindrical optical platform with some large components installed.

FIG. 3 is a diagram illustrating an example of major optical components of an ultrashort-pulse laser mounted within an embodiment of the compact cylindrical platform for optical components. In the example shown, plate 301, plate 302, and plate 303 have penetrations that allow for mounting of optical parametric amplifier 304 and pump laser 305. On bottom plate 306, fiber seed laser 307 and fiber optic stretcher 308 are mounted.

Figure 4:
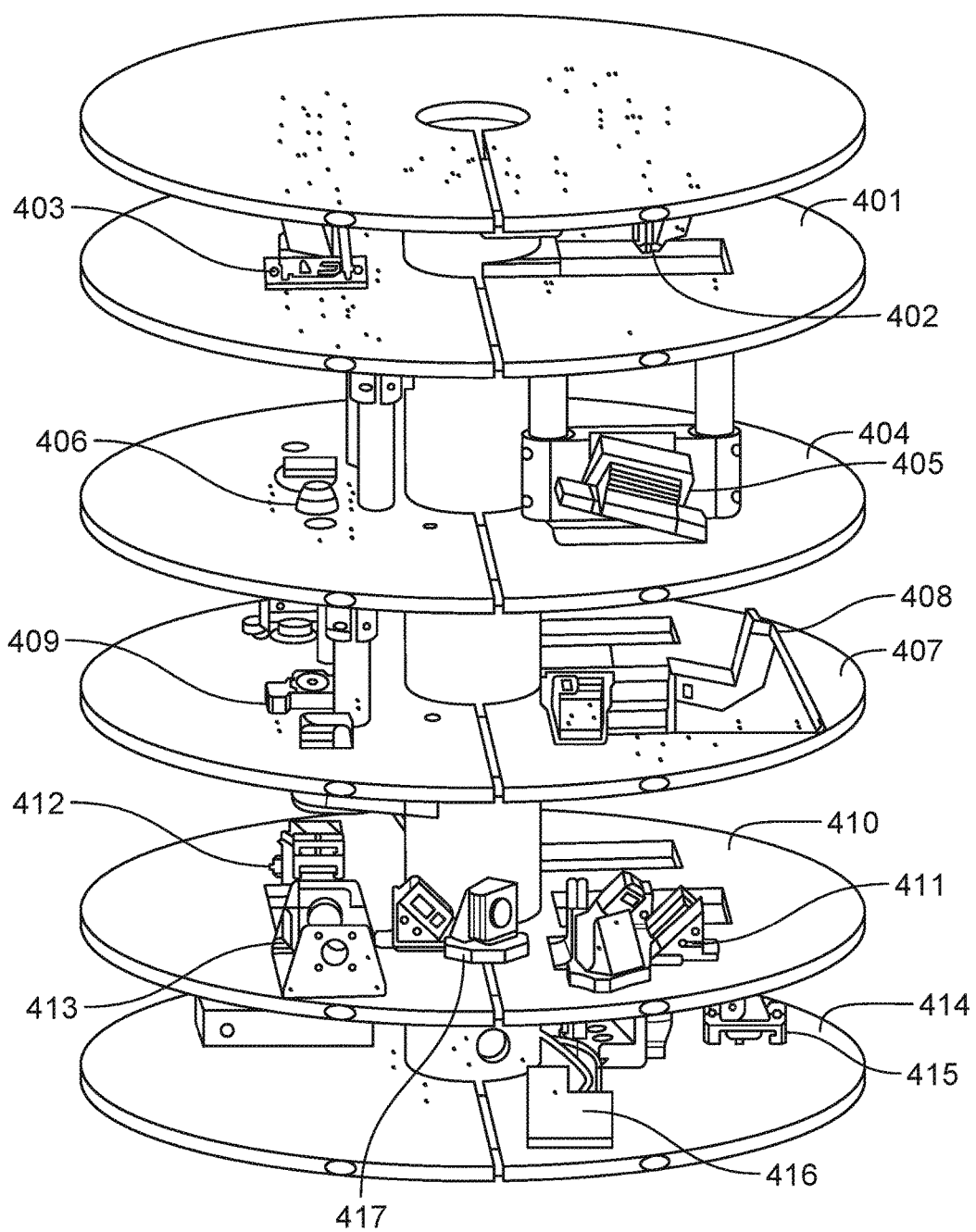
FIG. 4 is a diagram illustrating an example embodiment of a cylindrical optical platform configured with components for an ultrashort-pulse laser.

FIG. 4 is a diagram illustrating mounting optical components in an example embodiment of an ultrashort-pulse laser within a compact cylindrical platform for optical components. In the example shown, plate 401 contains penetration 402 for a pump laser and has cavity mirror assembly 403 mounted on it. Plate 404 has compressor grating 405 and mirror assembly 406 with polarizer. Mounted on plate 407 is retroreflector 408 that directs the beam to compressor grating 405 and iris 409. Plate 410 has mirror assembly 411 to direct the beam to and from compressor grating 405. Plate 410 also has cavity end mirror assembly 412, periscope 413, and mirror assembly 417. Fiber Bragg stretcher 416 is mounted to plate 414 as is mirror assembly 415, to direct the beam into a central cylinder that provides both structural support and a space for the beam path.

Figure 5:
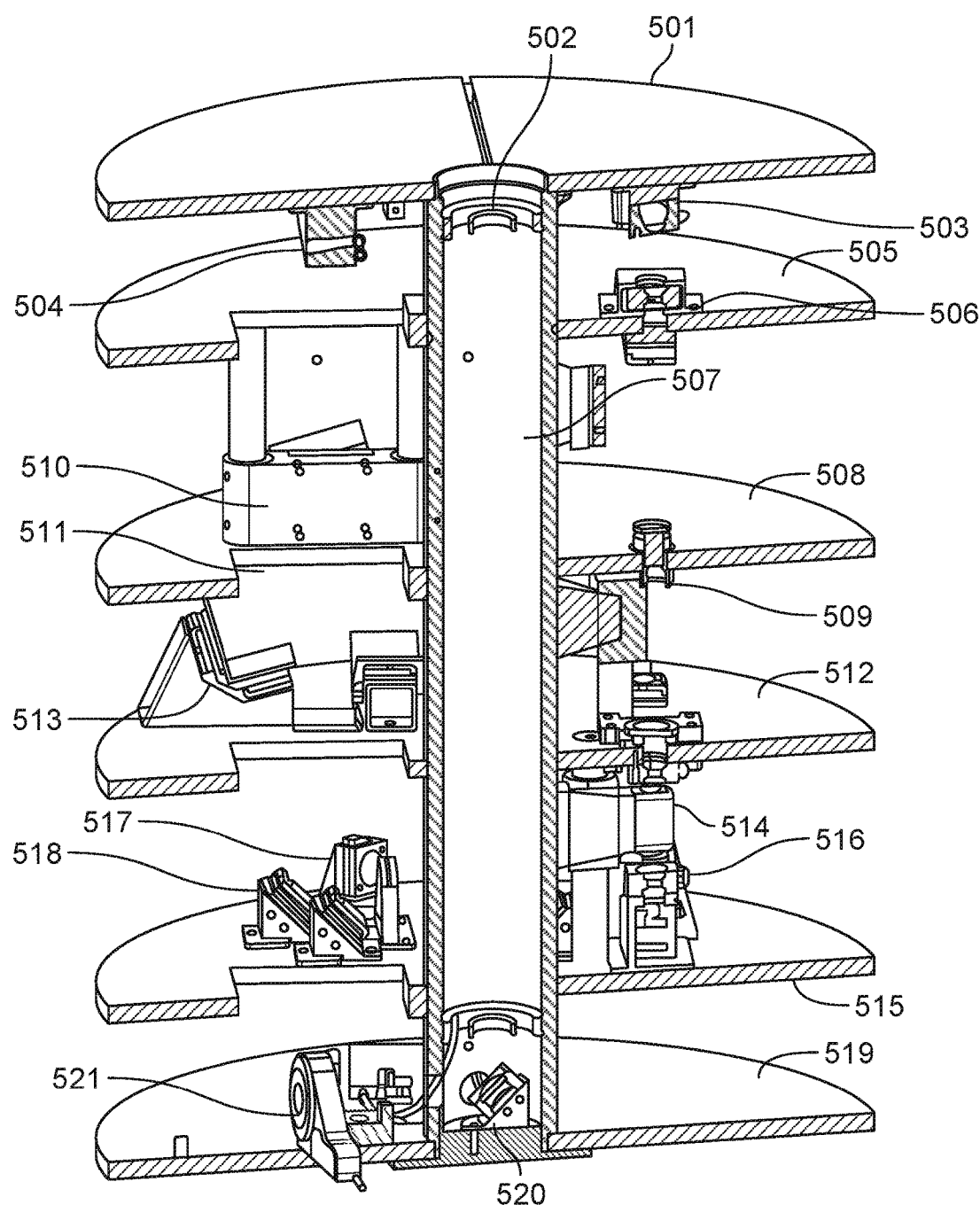
FIG. 5 is a diagram illustrating a cross section of an example embodiment of a cylindrical optical platform configured with components for an ultrashort-pulse laser.

FIG. 5 is a diagram illustrating the cross-section of the plate and interior cylinder assembly of a compact cylindrical platform for an ultrashort-pulse laser system. Top plate 501 has a central penetration for central cylinder 507 and output iris 502. Mirror assemblies 503 and 504 direct light from the cavity to the optical parametric amplifier (not shown). Plate 505 has cavity mirror assembly 506 mounted to it and grating bracket 510 between it and Plate 508. Plate 508 has penetration 511 for the optical parametric amplifier and is penetrated by polarizer 509. Mounted on plate 512 is compressor retroreflector 513. Between plate 512 and plate 515 is Pockels cell assembly 514 and cavity end mirror assembly 516. Plate 515 also has component 517 and mirrors 518 mounted to it. Output from the optical parametric amplifier passes through iris 521 mounted on plate 519 and is directed up the central cylinder by mirror assembly 520.

Figure 6:
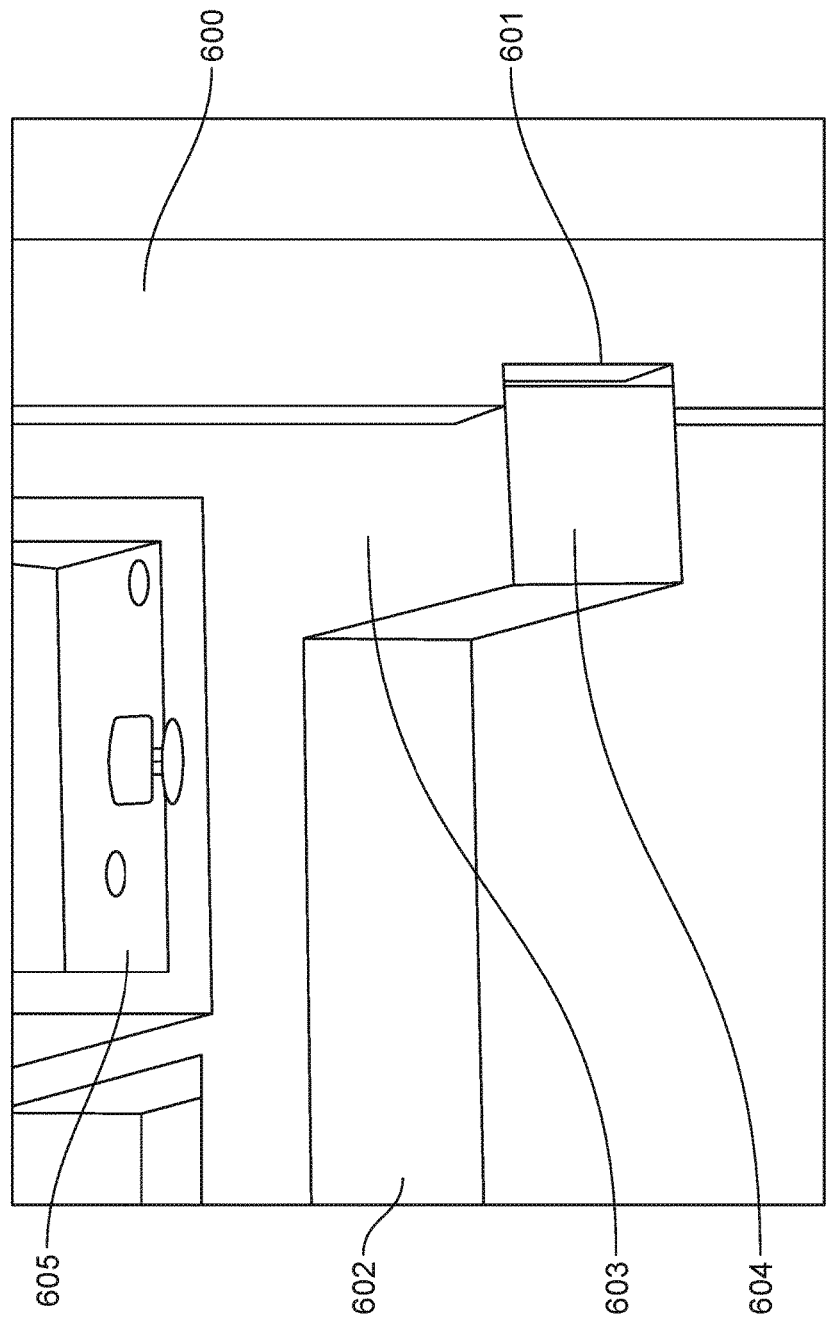
FIG. 6 is a diagram illustrating an example embodiment of a connection between a central cylinder and mounting plate.

FIG. 6 is a diagram illustrating an example embodiment of a connection between a central cylinder and a mounting plate. In the example shown, central cylinder 600 (shown in cross section) has crosswise slot 601 milled into it such that mounting plate 603, illustrated in cross section 604, fits tightly. Optical component 605 and mounting plate penetration 602 (similar to penetration 511 in FIG. 5) are presented for clarity and completeness.

Figure 7:
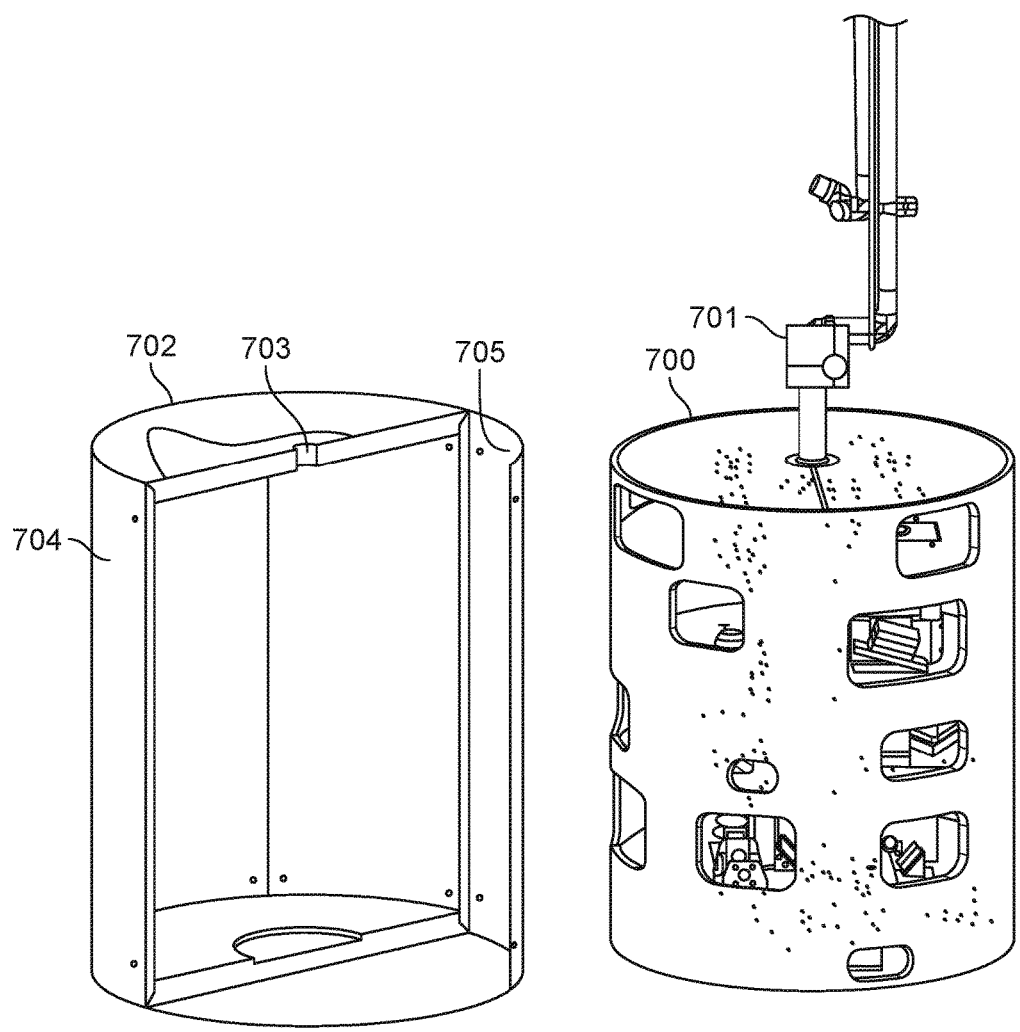
FIG. 7 is a diagram illustrating an example embodiment of an insulated external enclosure that can be used to enclose all of a plate and structural element assembly.

FIG. 7 is a diagram illustrating (in cutaway and cross section) an example embodiment of an insulated external enclosure that can be used to enclose all of the plate and structural element assembly. In the example shown, insulated external enclosure 702 comprises outer shell 705, shown independently for clarity, lined with insulation 704, shown in cross-section. Penetration 703 allows output device 701 from cylinder assembly 700 to extend beyond the external enclosure.

Figure 8:
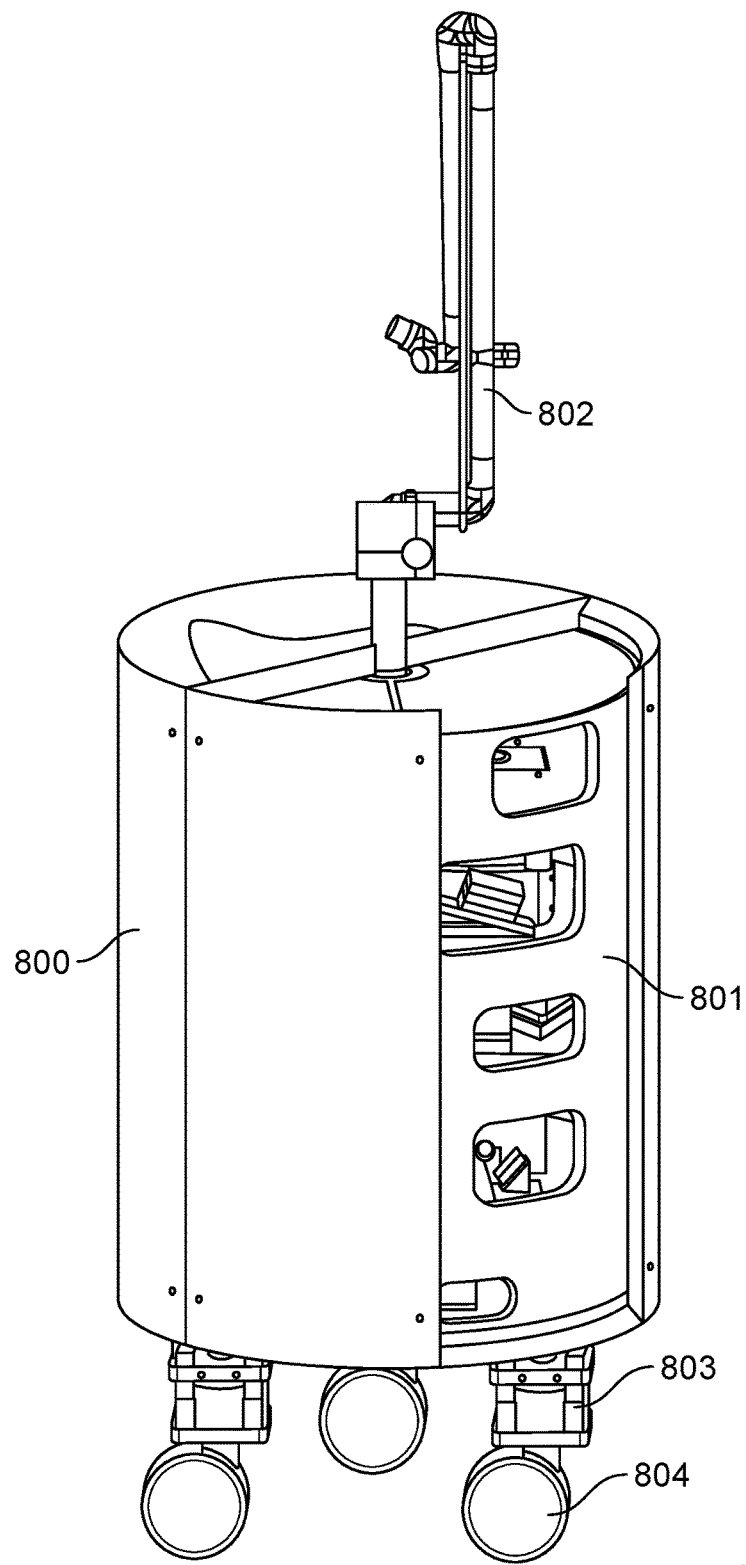
FIG. 8 is a diagram illustrating an example embodiment of an insulated external enclosure.

FIG. 8 is a diagram illustrating an example embodiment of an insulated external enclosure (with portions cut way to reveal interior structure). In the example shown, insulated external enclosure 800 encloses cylinder assembly 801 while allowing output device 802 to extend beyond the external enclosure. (In actual operation, insulated external enclosure 800 would extend around the entire circumference of and cover the entire top of the cylinder assembly 801 save for a penetration for attaching the output device 802.) The entire external enclosure and plate and structural element assembly is isolated from external vibration by pneumatic isolators 803. Mobility is afforded by wheels 804.

For convenience in this description, some of the plurality of plates have been depicted and referred to as "top" or "bottom" plates and have been shown to play various functional roles in addition to enclosing most or all of their respective ends of the cylinder assembly. It should be understood, however, that the cylindrical platform for optical components can be used in any orientation relative to its environment without a functional "up" or "down" or designated "top" or "bottom." It should also be understood that the outermost or extreme plates may serve primarily the function of enclosing most or all of their respective ends, or they may serve other functions as well.

Figure 9:
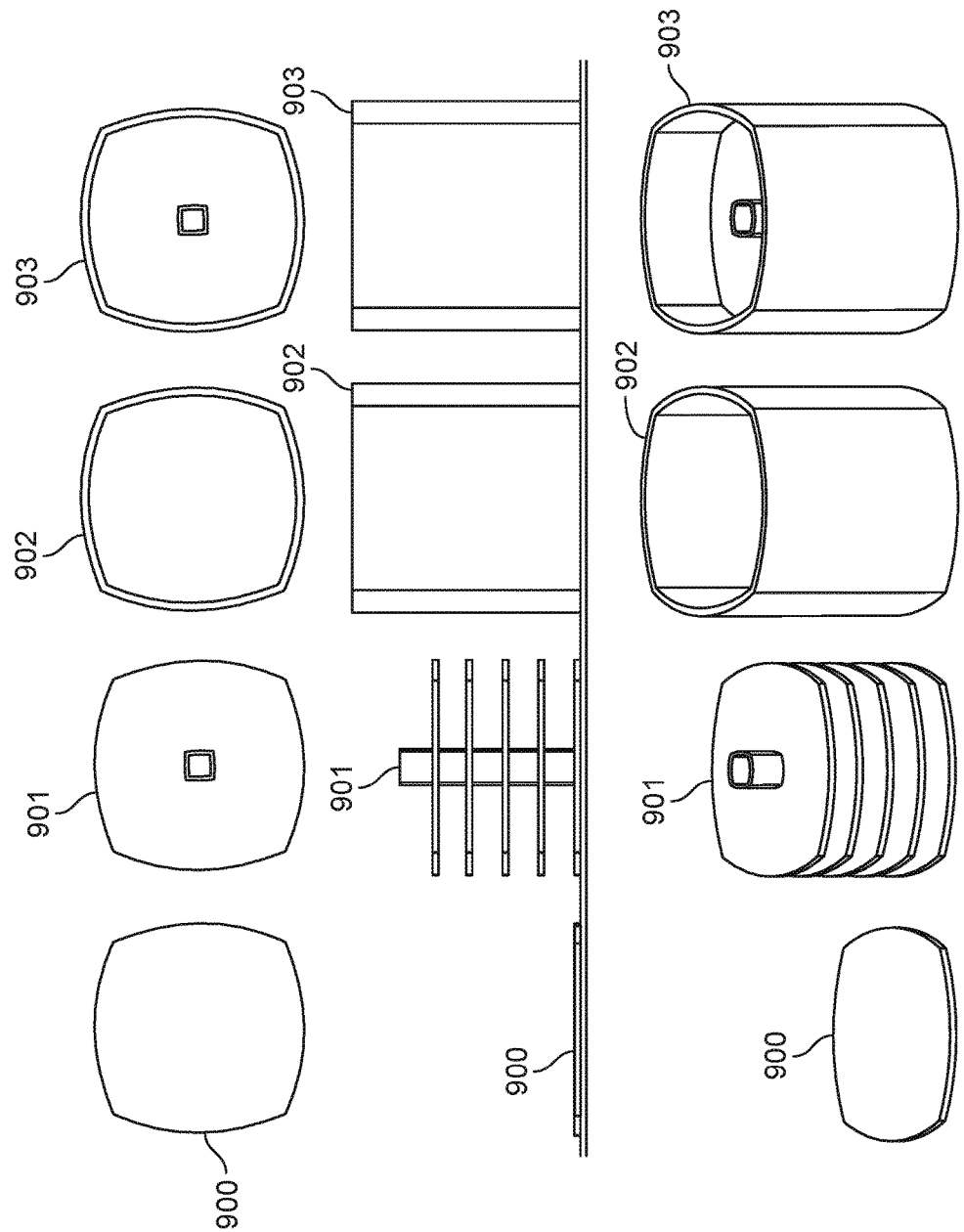
FIG. 9 is a diagram illustrating an example embodiment of a cylindrical platform.

FIG. 9 is a diagram illustrating an example embodiment of a cylindrical platform. In the example shown, diagrams show a top view, a side view, and a perspective view of element(s) of a cylindrical platform. Plate 900 comprises a four-sided curvilinear polygon plate. Stack 901 comprises a plurality of plates (e.g., similar to plate 900 but with an aperture) coupled together using an interior structural element (e.g., a cylinder, a four-sided curvilinear polygon post, a rectangular post, etc. that is inside of the aperture of a plate). Enclosure 902 is designed to enclose stack 901 with the addition of top and bottom plates (e.g., similar to plate 900 with or without apertures depending requirements). Filled enclosure 903 includes enclosure 902 with stack 901 inside.

Figure 10:
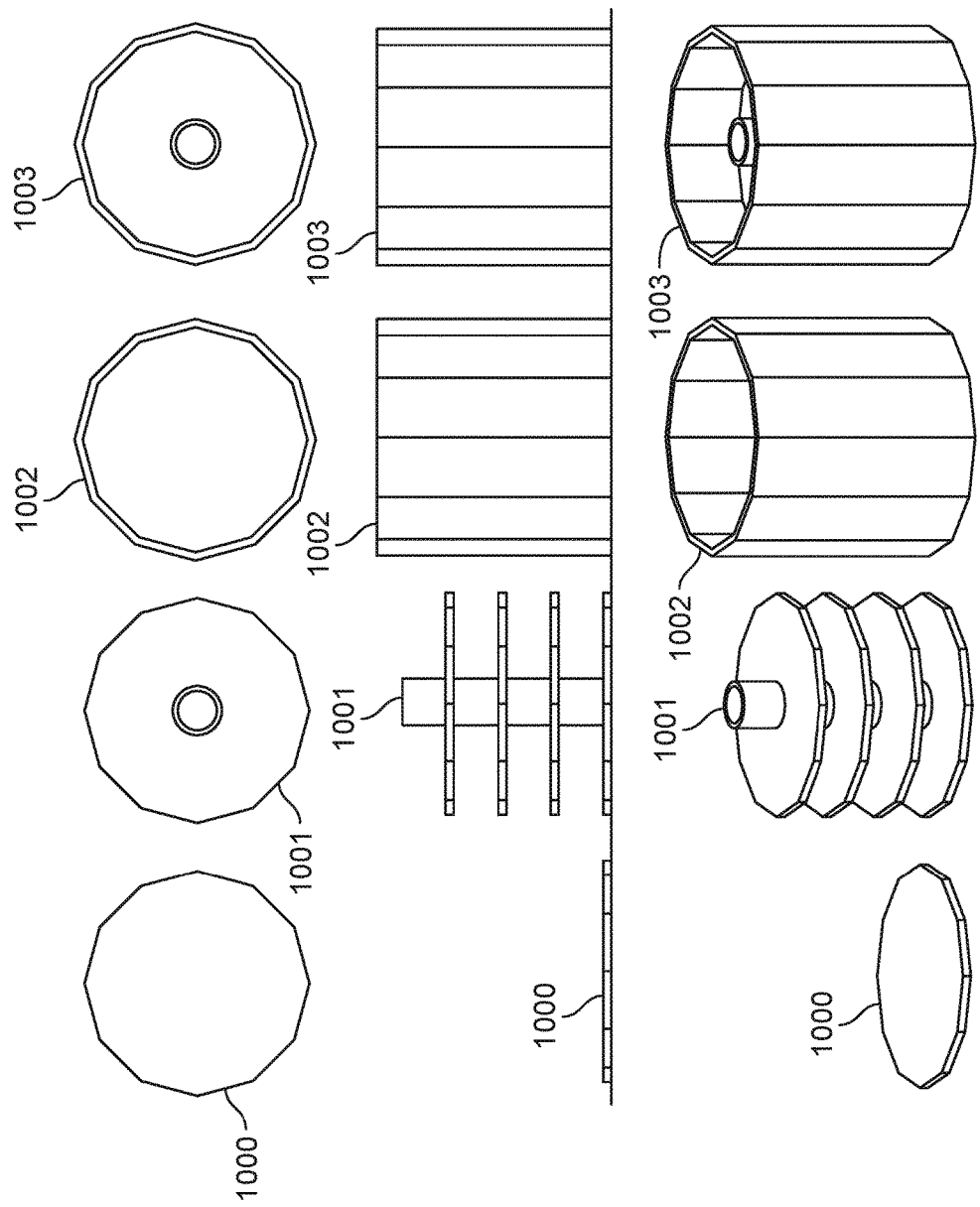
FIG. 10 is a diagram illustrating an example embodiment of a cylindrical platform.

FIG. 10 is a diagram illustrating an example embodiment of a cylindrical platform. In the example shown, diagrams show a top view, a side view, and a perspective view of element(s) of a cylindrical platform. Plate 1000 comprises a 12-sided polygon plate. Stack 1001 comprises a plurality of plates (e.g., similar to plate 1000 but with an aperture) coupled together using an interior structural element (e.g., a cylinder, a 12-sided curvilinear polygon post, a rectangular post, etc. that is inside of the aperture of a plate). Enclosure 1002 is designed to enclose stack 1001 with the addition of top and bottom plates (e.g., similar to plate 1000 with or without apertures depending requirements). Filled enclosure 1003 includes enclosure 1002 with stack 1001 inside.

FIG. 11 is a diagram illustrating an example of an embodiment of an internal structural element. In the example shown, internal structural element 1100 has outer diameter zones each with a different outer diameter. The outer diameters of the zones increase along the axial dimension so that a plate with larger diameter aperture (e.g., plate 1101) will go farther down internal structural element 1100 than a plate with smaller diameter aperture (e.g., plate 1102). In some embodiments, a clamp is used to hold the plate against the lip or ledge on the internal structural element 1100. In some embodiments, an adhesive is used to hold a plate against a lip or ledge on the internal structural element 1100.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A compact, environmentally isolated platform for mounting optical components, comprising:
   a plurality of similarly shaped substantially flat plates;
     each with a perimeter that is characterized as one or more of: circular, generally circular, oval, generally oval, substantially in a form of a curvilinear polygon, or substantially in the form of a polygon with a sufficient number of sides to approximate the curvilinear polygon;
     defining planes generally parallel to each other;
   an enclosing structural element;
     shaped to generally contain the plurality of similarly shaped substantially flat plates with an interior surface shaped to accommodate perimeters of the plurality of similarly shaped substantially flat plates; and
     surrounding the perimeters of the plurality of similarly shaped substantially flat plates; and,
   an interior structural element;
     passing through or connecting at least two of the plurality of similarly shaped substantially flat plates to provide structural support; and
   an external enclosure that contains the plurality of similarly shaped substantially flat plates, the enclosing structural element, and the interior structural element, wherein the external enclosure is insulated.

2. An apparatus as in claim 1, wherein the enclosing structural element or the external enclosure is pressurized with a dry gas.

3. An apparatus as in claim 1, wherein a cooling system cools specific components.

4. An apparatus as in claim 3, wherein a specific component of the specific components comprises a plate of the plurality of similarity of similarly shaped substantially flat plates.

5. An apparatus as in claim 1, wherein a cooling system cools an entirety of substantially flat plates, the enclosing structural element, and the interior structural element.

6. An apparatus as in claim 1, wherein a cooling system cools using a cooling fluid.

7. An apparatus as in claim 6, wherein the cooling fluid comprises one of the following: a liquid, a gas, a liquefied gas, nitrogen, liquid nitrogen, Freon, or water.

8. An apparatus as in claim 1, wherein the enclosing structural element contains channels or tubes for refrigerant which allows the enclosing structural element to function as an evaporator in a cooling system.

9. An apparatus as in claim 1, wherein the assembly comprising the plurality of similarly shaped substantially flat plates, the enclosing structural element, and the interior structural element is able to move independently of the external enclosure.

10. An apparatus as in claim 1, wherein an optical beam path travels through at least a portion of the interior structural element.

11. An apparatus as in claim 1, wherein an optical output mechanism is mounted to a central cylinder.

12. A compact environmentally isolated cylindrical platform for mounting optical components of a laser system, comprising:
   a plurality of generally circular substantially flat plates;
      defining planes generally parallel to each other; and
   an enclosing structural element;
      shaped as a cylinder to accommodate perimeters of the generally circular substantially flat plates; and
      surrounding the perimeters of the plurality of generally circular substantially flat plates; and,
   an interior structural element;
      generally shaped as the cylinder;
      passing through or connecting at least two of the plurality of generally circular substantially flat plates to provide structural support; and
   an external enclosure that contains the generally circular substantially flat plates, the enclosing structural element, and the interior structural element, wherein the external enclosure is insulated.

13. An apparatus as in claim 12, wherein the enclosing structural element or the external enclosure is pressurized with a dry gas.

14. An apparatus as in claim 12, wherein a cooling system cools specific components.

15. An apparatus as in claim 14, wherein a specific component of the specific components comprises a plate of the plurality of similarity of similarly shaped substantially flat plates.

16. An apparatus as in claim 12, wherein a cooling system cools an entirety of the plurality of generally circular substantially flat plates, the enclosing structural element, and the interior structural element.

17. An apparatus as in claim 12, wherein a cooling system cools using a cooling fluid.

18. An apparatus as in claim 17, wherein the cooling fluid comprises one of the following: a liquid, a gas, a liquefied gas, nitrogen, liquid nitrogen, Freon, or water.

19. An apparatus as in claim 12, wherein the enclosing structural element contains channels or tubes for refrigerant which allows the enclosing structural element to function as an evaporator in a cooling system.

20. An apparatus as in claim 12, wherein an assembly comprising the plurality of generally circular substantially flat plates, the enclosing structural element, and the interior structural element is able to move independently of the external enclosure.

21. An apparatus as in claim 12, wherein an optical beam path travels through at least a portion of the interior structural element.

22. An apparatus as in claim 12, wherein an optical output mechanism is mounted to the interior structural element.

* * * * *